(No Model.)
O. D. WARFIELD.
LATHE DOG.
No. 297,884. Patented Apr. 29, 1884.
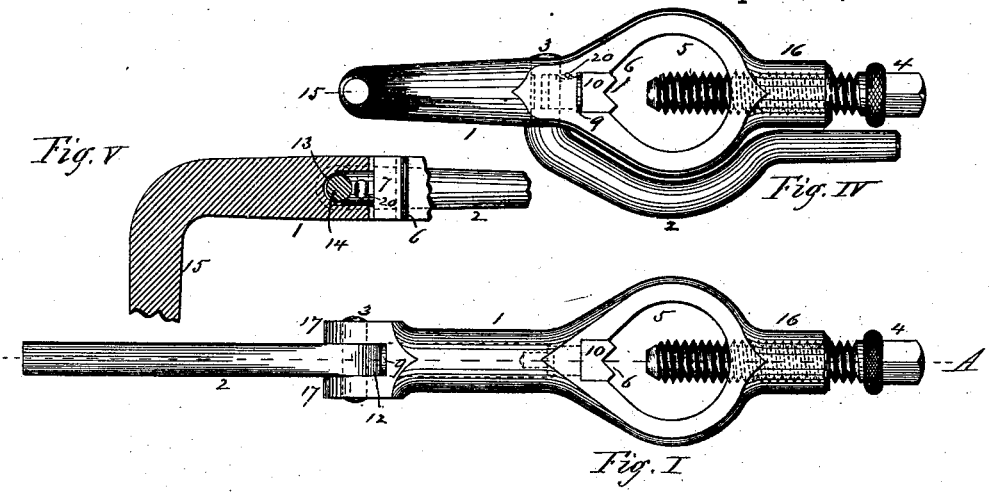
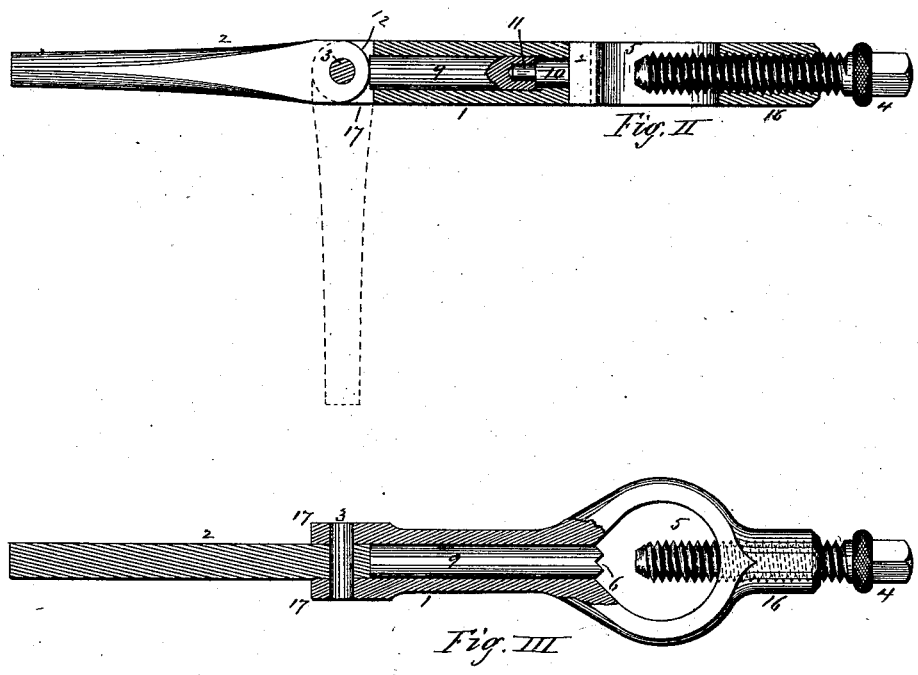
Witnesses.
N. E. Dinnell.
Chas. H. Wood
Inventor.
Oliver D. Warfield
By T. A. Curtis
Attorney.

UNITED STATES PATENT OFFICE.

OLIVER D. WARFIELD, OF CHICOPEE FALLS, MASSACHUSETTS, ASSIGNOR TO CHARLES H. WOOD, OF PROVIDENCE, RHODE ISLAND, AND EDWARD E. HOLTON, OF CHICOPEE, MASSACHUSETTS.

LATHE-DOG.

SPECIFICATION forming part of Letters Patent No. 297,884, dated April 29, 1884.

Application filed July 16, 1883. (No model.)

*To all whom it may concern:*

Be it known that I, OLIVER D. WARFIELD, of Chicopee Falls, in the county of Hampden and State of Massachusetts, have invented a new and useful Improvement in Lathe-Dogs, of which the following is a specification and description.

The object of my invention is to provide a dog for holding work in a lathe, into which the work may be easily and quickly secured without the use of a wrench, and in which it will be held securely while being operated upon, and I accomplish this by the mechanism substantially as hereinafter set forth, and illustrated in the accompanying drawings, in which—

Figure I is a front view of my invention. Fig. II is a longitudinal section at line A of Fig. I. Fig. III is a longitudinal section of a portion of the dog, showing a modification of the same. Fig. IV is a front view of a dog made according to my invention, with an eccentric lever made separate from the main portion of the dog; and Fig. V is a longitudinal section of a portion of the dog at the bent arm, and showing the eccentric and the shoe.

In the drawings, 1 represents the shank. 5 represents the eye; 16, the head; 4, the adjusting-screw turned through a threaded hole made longitudinally through the head; and 2 represents the cam or eccentric lever pivoted between the ears 17 at the end of the shank opposite the head. I make a hole longitudinally through the shank 1, and insert therein a rod, 9, which may be made a little longer than the hole through the shank, so as to project therefrom a little between the ears 17, and to project at the other end a short distance into the eye 5, with a V-shaped groove across the end of the rod, as at 6, into or against which the work is to be forced by the screw 4 in securing the work in the eye.

Instead of making the rod 9 all in one piece, I prefer, in practice, to make the hole in the shank, for nearly its whole length, of one diameter, and make a short portion, near the eye 5, of a little smaller diameter, and making the rod 9 a little longer than the hole of largest diameter. I then insert a shoe, 10, into the short portion of the hole of smallest diameter in the shank, and secure it therein, preferably, by a small projecting stud, 11, made on the end of the shoe, and forced snugly into a hole made in the end of the rod 9, as shown clearly in Fig. II. By this construction I am enabled to extend the exposed end of the shoe 10 the whole width of the shank to furnish a good bearing for the material to be operated upon when secured in the eye of the dog, and as the stud 11 of the shoe fits snugly the hole in the end of the rod, and is forced therein, and as said rod is larger in diameter than the socket to receive the shoe, the latter cannot drop out of its socket when the dog is held with the lever 2 uppermost. The rod 9 and shoe 10 might, however, be made of the same diameter, and a small part of the shoe be flattened on one side, and a small pin inserted transversely through the shank, as shown at 20 in Fig. IV, this being a well-known means of limiting the movement of a rod. The pivoted end of the lever 2 is made eccentric at 12 with reference to the pivot 3, that part of the lever between its edge and the pivot being thicker than that between its circular end 12 and the pivot, so that when the lever 2 is moved into a position shown in dotted lines in Fig. II the edge of the lever, impinging against the end of the rod 9, forces it into the shank and the exposed end of the shoe farther into the eye 5.

To secure the stock to be operated upon in the dog, the screw 4 is turned out, so that the stock may be inserted in the eye 5 between the end of the screw and the grooved end of the shoe, and the screw may be then turned in against the stock firmly with the fingers, and the lever 2 being then moved into the position shown in dotted lines, the shoe is firmly forced against the stock, and it is held between the shoe and the screw with sufficient force to be operated upon in a lathe by placing the dog in the face-plate in the usual manner, the lever 2 forming the ordinary arm of the dog.

In Figs. IV and V is shown a modification of the invention, in which the cam-lever is pivoted in the shank at a point nearer the shoe 10, and whose end, extending through a hole in the shank for a short distance in from each side of the shank, has a bearing at 13 in said hole, and forms the pivot on which the lever turns. A portion of this pivot end of the lever is made eccentric opposite the inner end of the shoe at 14, the latter being made as hereinbefore described, and as shown in Figs. I and II, and being prevented from dropping out of place by the pin 20, as before mentioned. In this modification, when the lever is moved into a position extending in the opposite direction from that shown in Fig. IV, the shoe 10 may be forced in toward the eccentric end of the lever, and the stock may then be placed in the eye 5 and the screw 4 turned in against it, and when the lever is turned into the position shown in black lines in Fig. IV the shoe will be forced more firmly against the stock and the latter be secured to be operated upon in the lathe. In this modification the arm of the dog, by which it is secured in the face-plate of the lathe, is made solid, as shown at 15 in Figs. IV and V.

Although the head of the screw 4 is made prismatic, or four-sided, as shown in the drawings, in order that a wrench may be used, if desired, this feature is not essential, because one of the objects of the invention is to dispense with the necessity of using a wrench in securing work in and removing it from the dog. The wrench is often mislaid, and no inconsiderable amount of time is often wasted by a workman in looking for a misplaced wrench with which to secure the stock in or remove it from the dog. By the use of this invention it is quickly and easily secured or removed by the fingers, and entirely without any necessity of using a wrench.

That part of the device which is provided with a V-shaped groove, and against which the stock has a bearing when secured in the dog, I denominate the "shoe," whether it extends entirely through or only partially through the shank in a longitudinal direction, and whether made in one piece or two. The only advantage of making the shoe in two parts is that in dogs of the smaller sizes the shoe, if made in a single piece, would have to be inserted into its socket from the end where the lever 2 is pivoted to the shank, and the grooved end of the shoe could not be of larger diameter than the socket itself. Therefore a larger bearing at the grooved end of the shoe may be obtained by making the shoe in two parts and inserting the shorter part into its socket from the eye of the dog, and the other part from the other end, and forcing them together. In larger dogs, for heavy work, however, where the shank is made larger, a sufficiently large bearing at the grooved end of the shoe may be obtained by making it in a single piece and inserting into the socket at the end in which the lever 2 is pivoted, as shown in Fig. III.

Having thus described my invention, what I claim as new is—

In an improved lathe-dog, the combination of an adjusting-screw turned into one end of the dog, with its threaded end projecting into the eye or opening which receives the work, a movable shoe located in a socket on the other side of the eye, and a cam-lever pivoted in the shank to force said shoe toward the adjusting-screw, substantially as described.

OLIVER D. WARFIELD.

Witnesses:
T. A. CURTIS,
CHAS. H. WOOD.